United States Patent [19]

Crookston

[11] 4,149,899

[45] Apr. 17, 1979

[54] CHROMIC OXIDE REFRACTORY

[75] Inventor: James A. Crookston, Mexico, Mo.

[73] Assignee: A. P. Green Refractories Co., Mexico, Mo.

[21] Appl. No.: 892,170

[22] Filed: Mar. 31, 1978

[51] Int. Cl.$^2$ .............................................. C04B 35/10
[52] U.S. Cl. ........................................ 106/66; 106/69
[58] Field of Search ..................................... 106/66, 69

[56] References Cited

U.S. PATENT DOCUMENTS

| | | | |
|---|---|---|---|
| 3,378,385 | 4/1968 | McCreight et al. | 106/66 |
| 3,862,845 | 1/1975 | Manigault | 106/66 |
| 3,888,687 | 6/1975 | Manigault | 106/66 |

Primary Examiner—James Poer
Attorney, Agent, or Firm—Gravely, Lieder & Woodruff

[57] ABSTRACT

An Alumina-chromic oxide refractory composition comprising the following ingredients:

Tabular alumina: 55–98%
Calcined alumina: 0–10%
Chromic oxide: 1–25%
Fume silica: 1–4%
Phosphate Compounds: 0–18%

The addition of fume silica or volatilized silica improves porosity, reheat expansion, and thermal shock resistance.

12 Claims, No Drawings

CHROMIC OXIDE REFRACTORY

BACKGROUND OF THE INVENTION

McCreight et al, U.S. Pat. No. 3,378,385 discloses a ceramically bonded. high alumina refractory made from a batch consisting essentially of fused alumina grain containing titania, finely divided chrome sesquioxide, and finely divided nonfused high alumina refractory material.

Davis et al, U.S. Pat. No. 3,192,058 discloses a refractory made from a mixture which may contain chrome ore, alumina and magnesia with from about 1 to 15% added finely divided, high purity $Cr_2O_3$.

Manigault, U.S. Pat. No. 3,888,687 discloses an alumina-chrome refractory which contains tabular alumina, calcined alumina, chronic oxide, and added phosphate compound.

Manigaust, U.S. Pat. No. 3,862,845 discloses an alumina-chromic oxide refractory composition from alumina, chromic oxide, $P_2O_3$ and magnesium oxide.

The foregoing refractory compositions, while useful in ferrous and non-ferrous industries, specifically in automotive foundry melting and holding furnaces at the slag line, have been restricted in certain applications because they exhibit poor thermal shock resistance and little or no expansion at high temperatures.

It is an object of this invention to produce an alumina-chromic oxide refractory composition with improved thermal shock resistance and increased reheat expansion at high temperatures. A specific application of the brick of the present invention is in rotary drum induction furnaces.

As the brick of this invention generally are used in contact with various molten slags and metals, it is very important that tight joints between brick be maintained. As the brick of the prior art exhibit only very slight expansion, or even slight shrinkage, when reheated to high temperatures, they must be laid up very carefully to prevent the slag or molten metal penetrating into the joints. Accordingly, it is desirable that brick used in these applications have increased reheat expansion in order to minimize the joint penetration.

It has been found that the addition of small, but effective amounts of fume silica to alumina-chromic oxide refractories produce a brick which has improved thermal shock resistance and increased reheat expansion without sacrificing the desirable properties found in present alumina-chromic oxide brick.

SUMMARY OF THE INVENTION

This invention involves an alumina-chromic oxide refractory composition which contains fume silica and exhibits improved porosity, reheat expansion, and good thermal shock resistance.

DETAILED DESCRIPTION

The alumina-chromic oxide refractory brick compositions of the prior art comprise the following compositions:

|  | % by weight | |
|---|---|---|
|  | Brick A | Brick B |
| Tabular Alumina | 65–99 | 59–98 |
| Calcined Alumina | 0–10 | 0–10 |
| Chromic Oxide | 1–25 | 1–25 |
| Phosphate Compounds | — | 1–18 |

As mentioned, such products have been useful as brick compositions in both ferrous and non-ferrous industries. However, such products have poor thermal shock resistance, and exhibit very slight shrinkage, neutral behavior, or very slight expansion when reheated to high temperatures.

It is the purpose of the present composition to produce refractory brick of the alumina-chromic oxide type with improved thermal shock resistance and increased reheat expansion without sacrificing other properties.

It has been found that the foregoing improvements can be obtained by making a small addition of fume silica (volatilized silica) to brick of alumina-chromic oxide type. Thus, the composition covered by the present invention is the following:

|  | % by weight |
|---|---|
| Tabular Alumina | 55–98 |
| Calcined Alumina | 0–10 |
| Chromic Oxide | 1–25 |
| Fume Silica | 1–4 |
| Phosphate Compounds | 0–18 |

Normal procedures are used in making brick according to this invention. The tabular alumina is used in various sizes ranging from a top size of about 3 to 8 mesh down to and including minus 325 mesh. The calcined alumina, chromic oxide, and fume silica are used in the minus 325 mesh fraction.

Various phosphate compounds can be used, including phosphoric acid, mono-aluminum phosphate, mono ammonium phosphate and aluminum dihydrogen phosphate.

Fume silica is very fine amorphous silica by-product of the ferro-silicon industry and typically has an average particle size of about 0.2 to about 0.7 microns, as measured on a Fisher sub-sieve-size analyzer. In the total composition, at least 40%, but no more than about 65% of the refractory materials should be minus 3 plus 65 mesh.

In preparing the brick of this invention, the different materials, i.e., alumina, chromic acid, phosphoric acid, and fume silica are mixed together with water, and an organic binder, if needed for handling purposes, and formed into shapes. Forming can be done by pressing, ramming, or any conventional means for producing refractory shapes. The shapes are then dried and fired at temperatures ranging from 600 to 3000° F.

EXAMPLE NO. 1

In order to more fully describe this invention, the following example is given. The following materials were used to make compositions as follows:

|  | % by weight | | | |
|---|---|---|---|---|
|  | Prior Art | | Brick of this invention | |
|  | A | B | C | D |
| Tabular alumina, 6 mesh/F | 80 | 80 | 80 | 80 |
| Tabular alumina, | 5 | 5 | 5 | 5 |

|  | % by weight | | | |
|---|---|---|---|---|
|  | Prior Art | | Brick of this invention | |
|  | A | B | C | D |
| 325 mesh/F |  |  |  |  |
| Calcined alumina, 325/F | 5 | 5 | 3 | 3 |
| Chromic oxide, 325/F | 10 | 10 | 10 | 10 |
| Fume silica | — | — | 2 | 2 |
| 85% Phosphoric acid (extra) | — | 1 | 1 | 4 |
| Dextrin (extra) | 1 | 1 | 1 | 1 |

These compositions were dry mixed, tempered with water, and then pressed into 9×4−½×2−178 ″ bricks at 10,000 psi pressure. The brick were then dried and burned to about 2900° F.

After firing, the bricks were tested to determine their properties which are listed as follows:

|  | Prior Art | | Brick of the Present Invention | |
|---|---|---|---|---|
|  | A | B | C | D |
| Bulk density, pcf | 203 | 204 | 205 | 208 |
| Apparent porosity, % | 16.4 | 16.1 | 14.7 | 11.8 |
| Modulus of rupture psi | 4345 | 4700 | 4290 | 4860 |
| Reheat, 3200° F |  |  |  |  |
| % Linear change | +0.11 | +0.19 | +0.59 | +0.22 |
| % volume change | +1.44 | +1.81 | +3.10 | — |
| Modified U.S. Steel Thermal Shock Test Average # of cycles before first corner spalled | 19 | 28 | 46 | — |
| Average # of cycles before failure | 25 | 43 | 50+ | 50+ |
| 2850° F Cup Slag Test using Automotive Foundry high Fe₂O₃ slag-degree of reaction | Very slight | negligible | negligible | negligible |

Based on the foregoing results, it is apparent that a small addition of fume silica to brick of the alumina-chromic oxide type results in increased reheat expansion and improved thermal shock resistance without detrimentally affecting other properties. In fact, porosity was also slightly improved. The use of increased phosphoric acid resulted in improved density, porosity, and strength without detrimentally affecting other properties.

The thermal shock test used (Modified U. S. Steel Thermal Shock Test) consists of cutting 2 inch cubes from the brick and subjecting these cubes to cycles of 30 minutes at 2500° F and 30 minutes at ambient. It should be noted that the brick of the present invention went considerably more cycles before spalling of corners first occurred and had not failed after 50 cycles at which time the test was terminated. This is standard procedure.

What is claimed is:

1. A refractory product comprising about 55% to about 98% tabular alumina, about 0% to about 10% calcined alumina, about 1% to about 25% chromic oxide, and about 1% to about 4% fume silica.

2. The product of claim 1 wherein about 40% to about 65% of the refractory material is minus 3 plus 65 mesh material.

3. The product of claim 1 wherein the tabular alumina is from 3 to minus 325 mesh and the calcined alumina is minus 325 mesh.

4. The product of claim 1 wherein the chromic oxide is minus 325 mesh.

5. The product of claim 1 including a phosphate compound.

6. The product of claim 5 wherein the phosphate is 0–18% of the refractory product.

7. A process for preparing a fired refractory composition which comprises the steps of
   a. mixing about 55% to about 98% tabular alumina, about 0% to about 10% calcined alumina and about 1% to about 4% chromic oxide with about 1% to about 4% fume silica,
   b. forming the mixture into a shape,
   c. firing the shape at about 600° F to about 3,000° F,
   d. and recovering a fired shape having improved reheat expansion and improved thermal shock resistance.

8. The process of claim 7 wherein about 40% to about 65% of the refractory material is minus 3 plus 65 mesh material.

9. The process of claim 7 wherein the tabular alumina is from 3 to minus 325 mesh and the calcined alumina is minus 325 mesh.

10. The process pf claim 7 wherein the chromic oxide is minus 325 mesh.

11. The process of claim 7 wherein the refractory composition includes a phosphate compound.

12. The process of claim 11 wherein the phosphate compound is 0–18% of the refractory product.

* * * * *

UNITED STATES PATENT AND TRADEMARK OFFICE
CERTIFICATE OF CORRECTION

PATENT NO. : 4,149,899
DATED : April 17, 1979
INVENTOR(S) : James A. Crookston

It is certified that error appears in the above-identified patent and that said Letters Patent are hereby corrected as shown below:

Column 1, line 17 - "chronic" should be ---chromic---.

Column 3, line 15 - '9 x 4 - 1/2 x 2 - 178"' should be
---9 x 4 - 1/2 x 2 - 1/2"---.

Signed and Sealed this

Thirty-first Day of July 1979

[SEAL]

Attest:

LUTRELLE F. PARKER
Attesting Officer    Acting Commissioner of Patents and Trademarks